(No Model.)

A. F. PRAHM.
SIGNAL LANTERN.

No. 593,606. Patented Nov. 16, 1897.

Witnesses
J. J. Hood
Carl Kreis

Inventor
Adolph F. Prahm.
By Attorneys
H. P. Hood & Son (No Model.) 2 Sheets—Sheet 2.

A. F. PRAHM.
SIGNAL LANTERN.

No. 593,606. Patented Nov. 16, 1897.

Witnesses
J. J. Hood
Carl Kreis

Inventor
Adolph F. Prahm.

By Attorneys

UNITED STATES PATENT OFFICE.

ADOLPH F. PRAHM, OF INDIANAPOLIS, INDIANA.

SIGNAL-LANTERN.

SPECIFICATION forming part of Letters Patent No. 593,606, dated November 16, 1897.

Application filed November 25, 1895. Serial No. 570,025. (No model.)

*To all whom it may concern:*

Be it known that I, ADOLPH F. PRAHM, a citizen of the United States, residing at Indianapolis, in the county of Marion and State of Indiana, have invented a new and useful Signal-Lantern, of which the following is a specification.

My invention relates to an improvement in signal-lanterns, more particularly to that class of signal-lanterns which is used on railway-trains.

The objects of my improvement are, first, to provide means whereby differently-colored lights may be shown from a single light-aperture, and, second, to provide such means for ventilation as will furnish abundant air to support combustion, but will prevent unsteadiness in the light.

The accompanying drawings illustrate my invention.

Figure 1:
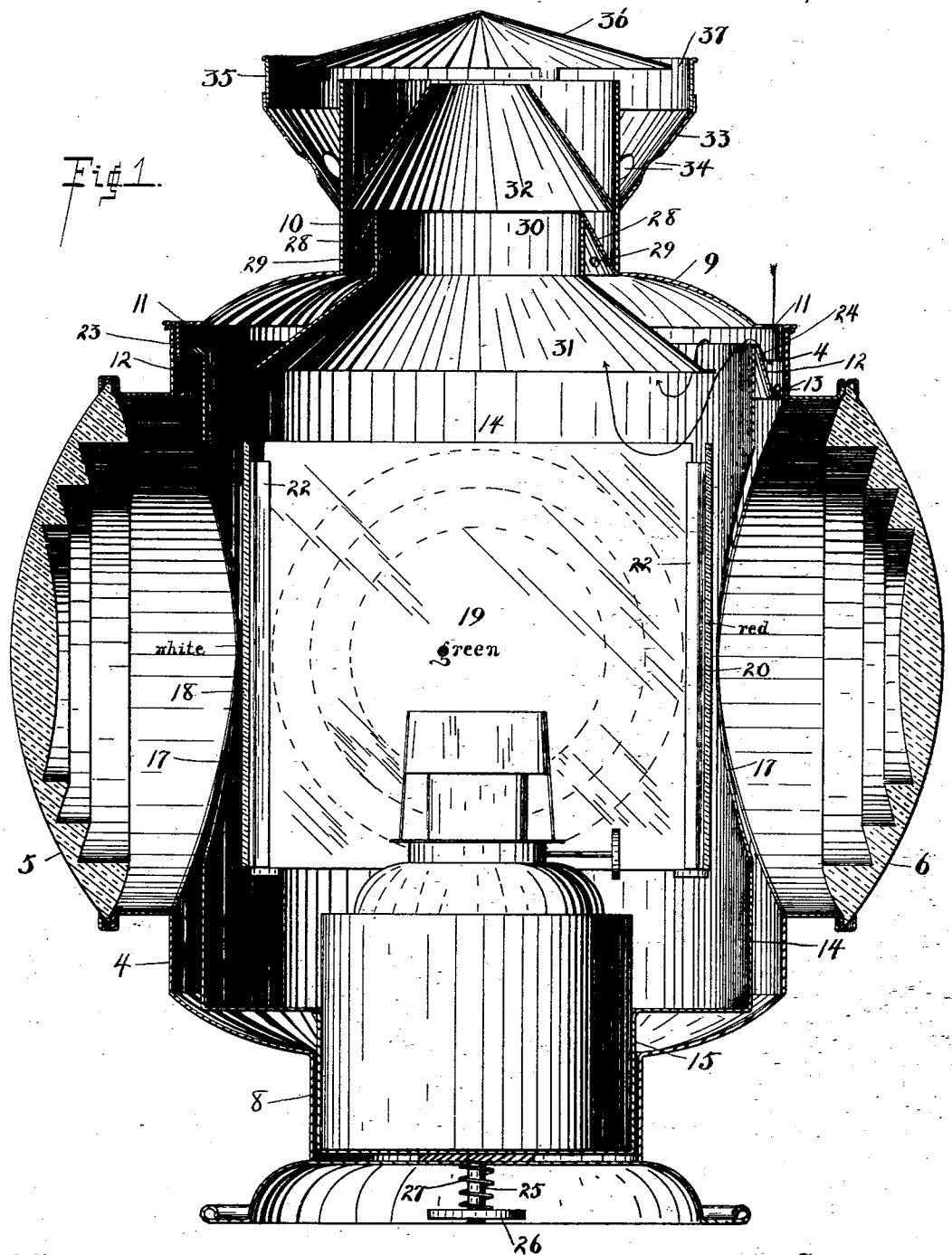
Figure 2:
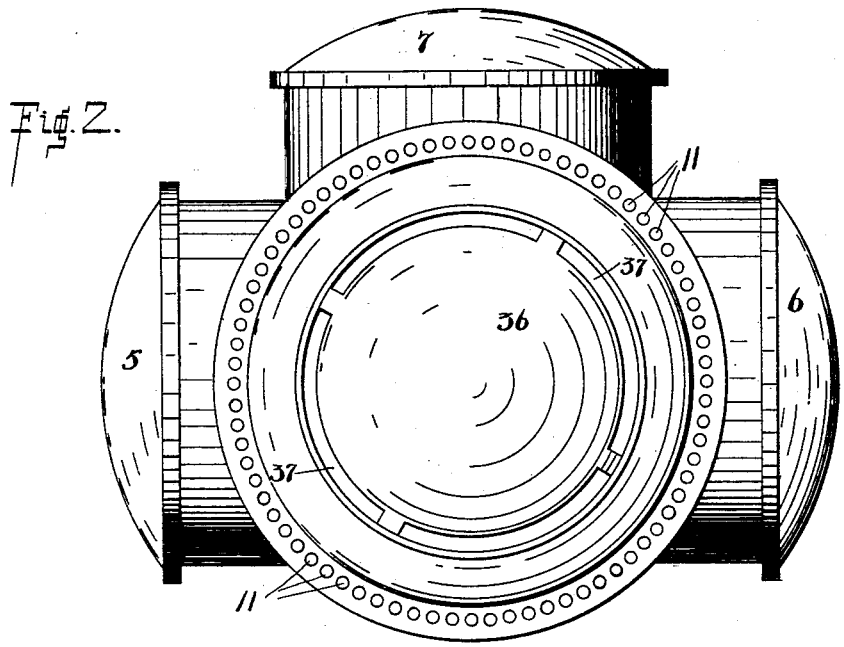
Figure 3:
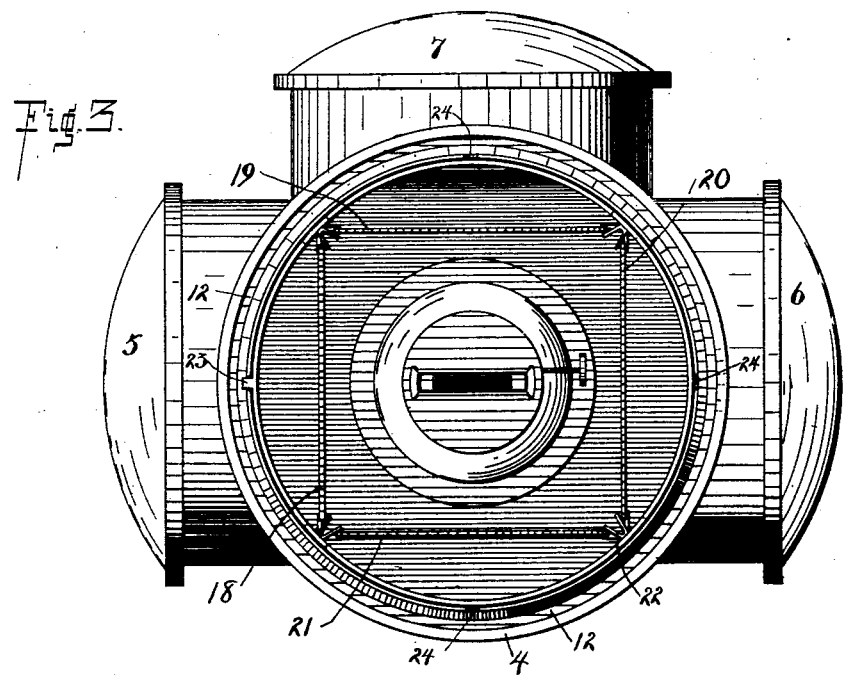

Figure 1 is a central vertical section of a signal-lantern designed to be secured to railway-cars. Fig. 2 is a plan thereof on a smaller scale; and Fig. 3 is a plan similar to Fig. 2, the ventilating-jack having been removed.

In the drawings, 4 indicates a casing forming the body of the lantern, said casing being provided in its circumference with a series of light-apertures or bull's-eyes 5, 6, and 7. Casing 4 is open at the top and is provided at its lower end with a cylindrical recess 8, and the said casing is unventilated—i. e., no provision is made in the casing proper for the admission of air to support combustion, air being introduced instead into the top of the casing, as hereinafter fully described. The open upper end of casing 4 is closed by a removable cover 9, having a central upwardly-extending flue 10. Cover 9 is provided in its upper surface near its outer edge with a series of ventilating-openings 11, which open downwardly and lead the air downward into the top of casing 4. Located immediately below openings 11 and secured to casing 4 is an annular drip-cup 12, said cup being provided for the purpose of changing the direction of the air-currents coming through openings 11 and also to catch any water which may come through said openings. A series of openings 13 is formed in casing 4 above the bottom of cup 12 to allow the escape of water from said cup.

14 indicates a revoluble casing or screen-carrier open at its top and provided at its bottom with a cylindrical extension 15, adapted to receive a lamp of any ordinary construction and to fit into and to revolve in recess 8 of casing 4, and the upper part of said carrier is adapted to fit into the opening formed by the inner wall of cup 12. Screen-carrier 14 is provided in its circumference with a series of openings 17, which are adapted to register with the openings 5, 6, and 7 in casing 4. A series of transparent colored screens 18, 19, 20, and 21 are removably mounted in slides 22 in screen-carrier 14 between the lamp and openings 17. Secured to the upper part of carrier 14 is a projecting lug 23, which is adapted to fit into any one of a series of notches 24, formed in the upper edge of the drip-cup, lug 23 and notches 24 being so placed that the screens will register with the light-apertures in casing 4 when said lug is in engagement with any one of the notches.

Secured to the bottom of the carrier is a downwardly-extending pin 25, which passes through the bottom of casing 4 and is provided near its free end with a knob 26, a spring 27 lying between knob 26 and casing 4, said spring acting to keep lug 23 in engagement with one of notches 24.

28 indicates a partition in the shape of a frustum of a hollow cone and provided with a series of ventilating-holes 29. Partition 28 projects upward into flue 10 and is secured at its lower larger end to the interior of said flue, and secured to its upper smaller end is a downwardly-extending flue 30, to the lower end of which is secured a downwardly-extending cone 31, the larger diameter of said cone being somewhat smaller than the inside diameter of screen-carrier 14 and extending below the top of cup 12 and into said carrier. Secured to the interior of flue 10, above cone 28, is another upwardly-extending cone 32, the use of which will appear in the description of the operation. Secured to the outside of flue 10 is a flaring annular flange 33, provided with a series of openings 34. The upper end of flange 33 is substantially even with the top of flue 10 and is adapted to receive ring 35, to which is secured cap-piece 36, said cap-piece being of larger diameter than flue 10 and of smaller diameter than ring 35, so as to leave a series of openings 37 between the cap and ring.

In the construction shown three light-apertures or bull's-eyes have been indicated, but it will be readily understood that the number of said bull's-eyes is entirely immaterial.

The operation of my device is as follows: A series of differently-colored screens is placed in slides 22 of carrier 14, the lamp is lighted, and the whole device, when made in the form shown, is secured to the rear end of the rear coach of a railway-train in the ordinary manner. It is often necessary to change the color of the lights in lanterns of this class so as to indicate the position of the train, and to do this the operator grasps knob 26, pushes upward thereon against the action of spring 27 until lug 23 is forced out of engagement with one of notches 24, and then turns said knob about its axis, thereby turning screen-carrier 14 in casing 4, and thus shifting the colored screens with relation to the bull's-eyes. When carrier 14 has been shifted through an angle sufficient to bring a new screen before each bull's-eye, lug 23 comes into position to engage with another one of notches 24 and is forced downward into said notch by spring 27. It will be noticed that extension 15 of carrier 14 is adapted to receive a lamp and fits into the recess 8 of the casing, and that the upper end of said carrier fits into the opening formed by the inner wall of cup 12. Secured to the bottom of extension 15 and passing down through the bottom of casing 4 is pin 25, provided with knob 26. By this construction the means for operating the screen-carrier is easily accessible, and, what is more important, the said operating means can in no way become heated by the burning of the lamp.

Lanterns have already been constructed with revolving screen-carriers, but in most of those constructions the screen-carrier has been operated by means placed in such a position that after the lamp has been burning a short time the said operating means becomes entirely too hot to be touched or operated. By supporting the screen-carrier at both the top and bottom the said carrier is rigidly supported, but in such a manner that it may be easily turned, thus making the lantern peculiarly adapted to railway service where a lantern receives many jars and very hard usage.

Air is supplied to the lamp through openings 11, which lead downward into the top of casing 4, and the air which passes therethrough is deflected upward by cup 12 over the upper edge of carrier 14. Owing to the draft through flue 30, created by the burning of the lamp, the fresh air is drawn downward over the upper edge of carrier 14 and is then forced upward into cone 31, and from thence out through flue 30 and cone 32 and comes into contact with cap 36, by which it is deflected outward over the upper edge of flue 10 and escapes through the openings 37 between cap 36 and ring 35. In case of a sudden downdraft through openings 11 the surplus air, after being deflected upward by the drip-cup, continues to pass upward along the outside of cone 31 and escapes through openings 29 into flue 10 and then into cone 32, and from thence out through the openings 37. Cap 36 is made larger than the upper end of cone 32 and larger than flue 10, so that a current of air striking said cap will be deflected from said openings and will pass downward through the openings 37 and will pass from there down through openings 34.

It sometimes happens that, owing to the forward movement of the train, the air will be forced over the top of ring 35 under cap 36 and over the top of flue 10, and by actual tests it has been found that air so entering flue 10 seriously interferes with the burning of the lamp, and for the purpose of again deflecting this current of air upward cone 32 is placed near the upper end of flue 10. This construction causes the air from the interior of casing 4 to pass through the small upper end of cone 32, and also causes any air which enters over the top of flue 10 to be deflected upward into the current of air coming from said upper end and to pass with it out through openings 37.

It has been customary heretofore to form in the upper end of the lamp-casing a series of ventilating-openings which lead radially into said casing. Lamps of this class are generally used upon railway-trains and are often forced through the air at the rate of sixty or seventy miles an hour. This rapid movement causes the air to be forced through the ventilating-openings and into the casing, causing the lamp to flicker. Various means have been devised to guard the openings and prevent the air from being forced through them, but even when guarded the air strikes the sides of the casing, passes upward into the guard, and is crowded with great force through the openings and into the lamp-casing. This difficulty has been obviated in my construction by placing the ventilating-openings 11 in the cover of the casing 4 and causing them to open downward. By this arrangement the movement of the train can in no way force the air into said openings, but said air will be drawn through the openings by the action of the lamp, thus insuring a steady flame which can in no way be affected by the movement of the train.

I claim as my invention—

1. In a signal-lantern, the combination with the lantern-casing having formed in the bottom thereof a downwardly-extending recess, and having a drip-cup secured on the inside near the top of said casing, of a revoluble screen-carrier mounted in said casing, the upper end of said carrier fitting into the opening formed by the inner wall of the drip-cup, and the lower end of said carrier fitting into the recess formed in the lantern-casing, and means secured to the lower end of the screen-carrier for causing a rotative movement thereof, as and for the purpose described.

2. In a signal-lantern, the combination with a lantern-casing provided with a light-aperture and having formed in the bottom thereof a downwardly-extending recess, of a drip-cup secured to the inside of said casing near the top thereof and provided on the inner wall thereof with a series of notches, a revoluble screen-carrier mounted in said casing, the upper end of said carrier fitting into the opening formed by the inner wall of the drip-cup, and the lower end of said carrier fitting into the recess formed in the lantern-casing, a lug secured to the upper end of the carrier and adapted to engage in any one of the notches formed in the inner wall of the drip-cup, and means secured to the lower end of the screen-carrier for lifting said carrier and causing a rotative movement thereof, substantially as described.

3. In a signal-lantern, the combination with a lantern-casing having a downwardly-extending recess formed in the bottom thereof, of a drip-cup secured to the inside of said casing near the top thereof, a series of notches formed in the inner wall of said drip-cup, a revoluble screen-carrier mounted in said casing, the upper end of said carrier fitting into the opening formed by the inner wall of the drip-cup, and the lower end of said carrier provided with a hollow, downward extension adapted to fit into the recess formed in the bottom of the casing and also adapted to receive the body of a lamp, a pin secured to the bottom of the screen-carrier and passing through an opening formed in the bottom of the lantern-casing, a knob secured to said pin below said casing, and a spring mounted between the knob and the casing, all combined and arranged to coöperate as and for the purpose set forth.

4. In a lantern, the combination with the unventilated main casing adapted to carry a lamp, of a cover for said casing forming a flue leading therefrom and provided with a series of ventilating-openings leading downward into the top of the casing, a drip-cup mounted below said openings and arranged to intercept the downward current of air which passes through said openings and deflect the said air into the casing, substantially as described.

5. In a lantern, the combination with the unventilated main casing adapted to carry a lamp, of a cover for said casing provided with a series of ventilating-openings leading down into the casing, a drip-cup mounted below said openings and adapted to deflect the air upward and into the casing, together with a cone-shaped flue secured to said cover and extending below the upper edge of the drip-cup, substantially as set forth.

6. In a lantern, the combination with the unventilated main casing adapted to carry a lamp, of a cover for said casing provided with a series of ventilating-openings leading down into the top of the casing, a drip-cup mounted below said openings and adapted to deflect the incoming air upward and into the casing, a main flue secured to the cover, a cone-shaped flue extending below the upper edge of the drip-cup, and of smaller diameter than said drip-cup, and secured at its upper end to the interior of the main flue by means of a partition provided with a series of openings communicating with the interior of the main flue, substantially as described.

7. In a ventilating-jack, the combination with the main flue, of a ring of larger diameter than said flue secured thereto by means allowing a free passage of air between said ring and flue, a cap, of larger diameter than said flue and of smaller diameter than said ring mounted above the flue with its lower edge below the upper edge of the ring, and an upwardly-extending cone secured to the inside of the flue near the top thereof, the arrangement being such that communication between the upper and the lower end of the flue can only be had through the upper end of the cone, as set forth.

8. In a lantern, the combination with the main casing adapted to carry a lamp, of a cover for said casing provided with a series of ventilating-openings leading down into the top of the casing, a drip-cup mounted below said openings and adapted to deflect the incoming air upward, a main flue secured to said cover, a cone-shaped flue extending below the upper edge of the drip-cup and secured at its upper end to the interior of the main flue by means of a partition provided with a series of openings communicating with the interior of the main flue, a ring of larger diameter than the main flue secured thereto by means allowing a free passage of air between said ring and flue, and a cap, of larger diameter than the flue and of smaller diameter than the ring, mounted above the flue with its lower edge below the upper edge of the ring, substantially as set forth.

9. In a lantern, the combination with the main casing, of a cover for said casing provided with a series of ventilating-openings leading down into the top of the casing, a drip-cup mounted below said openings and adapted to deflect the incoming air upward, a main flue secured to said cover, a cone-shaped flue extending below the upper edge of the drip-cup and secured at its upper end to the interior of the main flue by means of a partition provided with a series of openings communicating with the interior of the main flue, a second cone mounted above said partition and secured to the interior of the main flue near the top thereof, a ring of larger diameter than the main flue and secured thereto by means allowing a free passage of air between said ring and flue, and a cap, of larger diameter than the flue and of smaller diameter than the ring, mounted above the flue with its lower edge below the upper edge of the ring, substantially as described.

10. In a signal-lantern, the combination with the main casing, of a cover for said casing provided with a series of ventilating-openings leading down into the top of the casing, a drip-cup mounted below said openings and adapted to deflect the air upward, a revoluble screen-carrier mounted in said casing, the upper end of said carrier fitting in the opening formed by the inner wall of the drip-cup, a cone-shaped flue secured to the cover and extending down into said screen-carrier and below the upper edge of the drip-cup, and means secured to the lower end of the screen-carrier for causing a rotative movement thereof, all combined and arranged to coöperate substantially as and for the purpose set forth.

11. In a signal-lantern, the combination with the main casing, of a cover for said casing provided with a series of ventilating-openings leading down into the top of the casing, a drip-cup mounted below said openings and adapted to deflect the air upward, a revoluble screen-carrier mounted in said casing, the upper end of said carrier fitting into the opening formed by the inner wall of the drip-cup, and the lower end of said carrier being provided with a downward extension adapted to fit into a recess formed in the bottom of the main casing, a cone-shaped flue secured to the cover and extending down into the screen-carrier, and means secured to the lower portion of the screen-carrier for causing a rotative movement thereof, all combined and arranged to coöperate substantially as and for the purpose set forth.

12. In a signal-lantern, the combination with the main casing, of a cover for said casing provided with a series of ventilating-openings leading down into the top of the casing, a drip-cup mounted below said openings and adapted to deflect the incoming air upward, a revoluble screen-carrier mounted in said casing, the upper end of said carrier fitting in the opening formed by the inner wall of the drip-cup, a cone-shaped flue secured to the cover and extending down into said screen-carrier, and means secured to the lower portion of the screen-carrier for causing a rotative movement thereof, all combined and arranged to coöperate substantially as set forth.

13. In a signal-lantern, the combination with the main casing, of a cover for said casing provided with a series of ventilating-openings leading down into the top of the casing, a drip-cup mounted below said openings and adapted to deflect the incoming air upward, a revoluble screen-carrier mounted in said casing, the upper end of said carrier fitting in the opening formed by the inner wall of the drip-cup, a cone-shaped flue secured to the cover and extending down into said screen-carrier, a downward extension formed on the lower end of the screen-carrier and adapted to fit into a recess formed in the bottom of the main casing, a pin secured to the bottom of said downward extension and passing through an opening formed in the bottom of the main casing, and a knob secured to said pin below said casing, all substantially as set forth.

14. In a signal-lantern, the combination with the main casing, of a cover for said casing provided with a series of ventilating-openings leading down into the top of the casing, a drip-cup mounted below said openings and adapted to deflect the incoming air upward, a revoluble screen-carrier mounted in the casing, the upper end of said carrier fitting in the opening formed by the inner wall of the drip-cup, a main flue secured to the cover and extending upward therefrom, a cone-shaped flue extending down into the screen-carrier and secured at its upper end to the interior of the main flue by means of a partition provided with a series of openings communicating with the interior of the flue, substantially as set forth.

15. In a signal-lantern, the combination with the main casing, of a cover for said casing provided with a series of ventilating-openings leading down into the top of the casing, a drip-cup mounted below said openings and adapted to deflect the incoming air upward, a revoluble screen-carrier mounted in the casing, the upper end of said carrier fitting in the opening formed by the inner wall of the drip-cup, means secured to the lower portion of said screen-carrier for causing a rotative movement thereof, a main flue secured to the cover and extending upward therefrom, a cone-shaped flue extending down into the screen-carrier and secured at its upper end to the interior of the main flue by means of a partition provided with a series of openings communicating with the interior of the flue, a ring of larger diameter than the main flue secured thereto by means allowing a free passage of air between said ring and flue, and a cap, of larger diameter than the flue and of smaller diameter than the ring, mounted above the flue with its lower edge below the upper edge of the ring, substantially as and for the purpose set forth.

16. In a signal-lantern, the combination with the main casing, of a cover for said casing provided with a series of ventilating-openings leading down into the top of the casing, a drip-cup mounted below said openings and adapted to deflect the incoming air upward, a revoluble screen-carrier mounted in the casing, the upper end of said carrier fitting in the opening formed by the inner wall of the drip-cup, means secured to the lower portion of said screen-carrier for causing a rotative movement thereof, a main flue secured to the cover and extending upward therefrom, a cone-shaped flue extending down into the screen-carrier and secured at its upper end to the interior of the main flue by means of a partition provided with a series of openings communicating with the interior of the flue, a second cone mounted above said partition, in the main flue and near the top thereof, a ring of larger diameter than the main flue and secured thereto by means allowing a free passage of air between the said ring and flue, and a cap, of larger diameter than the flue and of smaller diameter than the ring, mounted above the flue with its lower edge below the upper edge of the ring, all combined to coöperate substantially as and for the purpose set forth.

17. In a signal-lantern, the combination with the main casing, of a cover for said casing provided with a series of ventilating-openings leading down into the top of the casing, a drip-cup mounted below said openings and adapted to deflect the incoming air upward, a series of notches formed in the upper edge of the inner wall of the drip-cup, a revoluble screen-carrier mounted in the casing, the upper end of said carrier fitting in the opening formed by the inner wall of the drip-cup, a hollow, downward extension formed on the lower end of the screen-carrier and adapted to fit into a recess formed in the bottom of the main casing and also adapted to receive a lamp, a pin mounted on the bottom of said extension and passed through an opening formed in the bottom of the main casing, a knob secured to said pin below the casing, a spring mounted between said knob and casing, a lug secured to the upper end of the carrier and adapted to engage in any one of the series of notches formed in the inner wall of the drip-cup, a main flue secured to the cover and extending upward therefrom, a cone-shaped flue extending down into the screen-carrier and secured at its upper end to the interior of the main flue by means of a partition provided with a series of openings communicating with the interior of the flue, a second cone mounted above said partition, in the main flue and near the top thereof, a ring, of larger diameter than the main flue and secured thereto by means allowing a free passage of air between said ring and flue, and a cap, of larger diameter than the flue and of smaller diameter than the ring, mounted above the flue with its lower edge below the upper edge of the ring, all combined and arranged to coöperate substantially as and for the purpose set forth.

ADOLPH F. PRAHM.

Witnesses:
   ADDIE J. PRAHM,
   MARY E. PRAHM.